US011341029B1

(12) United States Patent
Mardix et al.

(10) Patent No.: US 11,341,029 B1
(45) Date of Patent: May 24, 2022

(54) VIRTUAL SANDBOX ENVIRONMENT OF CLOUD COMPUTING RESOURCES

(71) Applicant: Datorama Technologies Ltd., Tel-Aviv (IL)

(72) Inventors: Chen Mardix, Tel-Aviv (IL); Oded Gazit, Tel-Aviv (IL); Or Koren, Tel-Aviv (IL)

(73) Assignee: Datorama Technologies Ltd., Tel-Aviv (IL)

( * ) Notice: Subject to any disclaimer, the term of this patent is extended or adjusted under 35 U.S.C. 154(b) by 0 days.

(21) Appl. No.: 17/148,674

(22) Filed: Jan. 14, 2021

(51) Int. Cl.
| | |
|---|---|
| *H04L 29/06* | (2006.01) |
| *H04L 29/08* | (2006.01) |
| *H04L 12/26* | (2006.01) |
| *G06F 3/0484* | (2022.01) |
| *G06F 9/44* | (2018.01) |
| *G06F 11/36* | (2006.01) |
| *G06F 8/60* | (2018.01) |
| *G06F 16/23* | (2019.01) |
| *G06F 21/54* | (2013.01) |

(52) U.S. Cl.
CPC ............ *G06F 11/3664* (2013.01); *G06F 8/60* (2013.01); *G06F 16/2379* (2019.01); *G06F 21/54* (2013.01); *G06F 2221/033* (2013.01)

(58) Field of Classification Search
CPC ............... G06Q 30/02; G06Q 30/0269; G06Q 30/0273; G06Q 30/0202; G06Q 30/0201; G06Q 30/0277; G06Q 50/01; G06F 16/9535; G06F 11/3664; G06F 16/2379; G06F 8/60; G06F 21/54; G06N 20/00; H04L 67/10; H04L 67/1097; H04L 67/02; H04L 67/12; H04L 63/105
See application file for complete search history.

(56) References Cited

U.S. PATENT DOCUMENTS

| | | | |
|---|---|---|---|
| 10,725,638 B1 * | 7/2020 | Gardner | ............... G06F 3/0482 |
| 10,872,032 B1 * | 12/2020 | Russell | ............... G06F 11/3696 |

OTHER PUBLICATIONS

Kumar SM et al., Performance dashboard: Cutting-edge business intelligence and data visualization, 7 pages (Year: 2017).*
Xiao et al., Analysis on Sandbox Technology of Adobe Reader X, 4 pages (Year: 2013).*

* cited by examiner

*Primary Examiner* — Thuy Dao

(57) ABSTRACT

A method, system and computer program product for providing dual mode view of cloud computing environment. User request for performing operation on entity of the environment while in sandbox view being intercepted by client and sent to server with sandbox token obtained therefrom responsive to user switch from production view to sandbox view. Validation of sandbox view by server being performed using the sandbox token. Data structure comprising identification as production/sandbox of each entity of the environment and each sandbox modified production entity, and datastore of all entities of the environment and data thereof, being used for processing the request and recording results thereof. Sandbox entities being filtered out of production view, and sandbox modified production entities being filtered out of sandbox view.

15 Claims, 7 Drawing Sheets

VIRTUAL SANDBOX ENVIRONMENT OF CLOUD COMPUTING RESOURCES

BACKGROUND

Some embodiments of the disclosed subject matter relate to data engineering and, more specifically, but not exclusively, to a virtual sandbox environment of cloud computing resources.

With the advent and increasing availability of high-capacity networks, low-cost computers and storage devices, as well as widespread adoption of hardware virtualization, service-oriented architecture and autonomic and utility computing, software and information technology industries witness a continued growth in offering and usage of cloud computing.

Cloud computing entails delivery or availability on-demand of computing services or computer system resources, such as storage or processing of data, without direct active management by users and, in general, effected via online communication channel such as the Internet.

Platform as a service (PaaS) is one of prevalent, standard cloud computing service models, among which are also included infrastructure as a service (IaaS), software as a service (SaaS), and the like. The PaaS category includes services that supply on-demand environment for developing, testing, delivering, and managing software applications.

Users of cloud-based software development and deployment environment offered in PaaS model, such as vendors, providers, developers and the like may perform occasionally revisions and changes to an underlying design or composition of components during life cycle of their software product or service. Since such modifications may have unexpected or hard to predict outcomes or effects it may be desirable to test them in a controlled manner prior to incorporation thereof in a commercially available version. For example, a developer considering to introduce new features may wish to explore their interaction with existing functionality to verify no conflicts or abnormal behavior result therefrom. This goal may be achieved through the use of a mock environment referred to by the term "sandbox".

A sandbox is an isolated environment where a user can safely experiment and test changes that the user intends to apply to their live environment. The sandbox environment thus allows users to learn about the implications of these intended changes in advance, in order to decide on how to best conduct them, without actually causing any harm to the live environment in the process.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings.

DETAILED DESCRIPTION

Figure 1A:
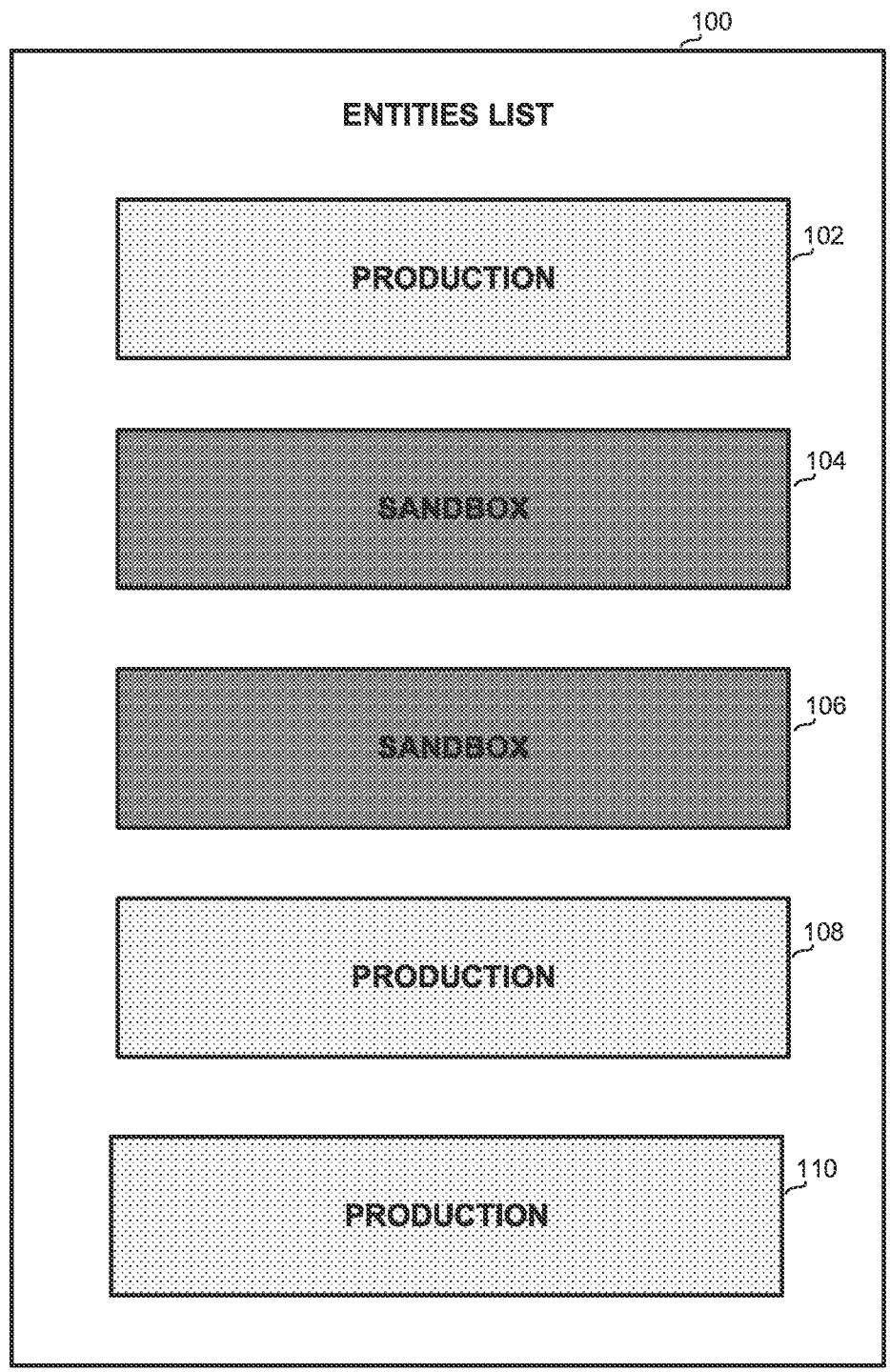
FIG. 1A is a schematic block diagram of an exemplary entities list in a virtual sandbox environment of cloud computing resources.

According to one aspect of the disclosed subject matter there is provided a method for providing a dual mode view of an environment for cloud computing software development and deployment accessible via a server, comprising: intercepting a request of a user for performing an operation on an entity of the environment while in sandbox view; and retrieving from storage and appending to the request a sandbox token obtained from the server responsive to the user switching from production view to sandbox view, wherein the sandbox token being configured for enabling the server performing processing of the request comprising: validating sandbox view selection by the user; determining identification of the entity of the request using a data structure comprising identification of each entity in a datastore of the environment as one of a production entity and a sandbox entity, the data structure further comprising an indication of each production entity modified in sandbox view; and based on determination of the identification of the entity of the request and result of performing the operation thereon, updating at least one of the data structure and datastore; wherein each sandbox entity being filtered out of production view and each production entity modified in sandbox view being filtered out of sandbox view.

Optionally the operation on the entity being one of: creating the entity; reading data from the entity; updating data of the entity; and deleting the entity.

Optionally the sandbox token being stored for a duration of a browser session of the user.

Optionally the sandbox token being unique.

Optionally at least one entity of the environment is of a type being one of: a data stream; a page; a report; and a dashboard.

According to another aspect of the disclosed subject matter there is provided a method for providing a dual mode view of an environment for software development and deployment, comprising: receiving a request of a user for performing an operation on an entity of the environment; and performing processing of the request comprising: responsive to the request comprising a sandbox token, validating sandbox view selection by the user; determining identification of the entity of the request using a data structure comprising identification of each entity in a datastore of the environment as one of a production entity and a sandbox entity, the data structure further comprising an indication of each production entity modified in sandbox view; and based on determination of the identification of the entity of the request and result of performing the operation thereon, updating at least one of the data structure and datastore; wherein each sandbox entity being filtered out of production view and each production entity modified in sandbox view being filtered out of sandbox view.

Optionally processing of the request comprising adding the entity to the datastore, defining identification of the entity as a sandbox entity and indicating an operation of addition of the entity in the data structure responsive to validating sandbox view selection and the operation of the request being addition of the entity.

Optionally processing of the request comprising performing the operation on a copy of the entity and adding thereof to the datastore, defining identification of the copy as a sandbox entity and indicating an operation of replacement of the entity in the data structure responsive to validating sandbox view selection, the identification of the entity being determined as production entity and the operation of the request being editing of the entity.

Optionally processing of the request comprising indicating an operation of deletion of the entity in the data structure responsive to validating sandbox view selection, the identification of the entity being determined as production entity and the operation of the request being deleting of the entity.

Optionally the sandbox token being generated and sent to a client responsive to a request received therefrom indicating the user switching from production view to sandbox view.

Optionally the sandbox token being unique.

Optionally at least one entity of the environment is of a type being one of: a data stream; a page; a report; and a dashboard.

According to yet another aspect of the disclosed subject matter there is provided a system for providing a dual mode view of an environment for software development and deployment, comprising: a processing circuitry adapted to execute a code for: receiving a request of a user for performing an operation on an entity of the environment; and performing processing of the request comprising: responsive to the request comprising a sandbox token, validating sandbox view selection by the user; determining identification of the entity of the request using a data structure comprising identification of each entity in a datastore of the environment as one of a production entity and a sandbox entity, the data structure further comprising an indication of each production entity modified in sandbox view; and based on determination of the identification of the entity of the request and result of performing the operation thereon, updating at least one of the data structure and datastore; wherein each sandbox entity being filtered out of production view and each production entity modified in sandbox view being filtered out of sandbox view.

According to yet another aspect of the disclosed subject matter there is provided a computer program product comprising: a non-transitory computer readable storage medium; program instructions for executing, by a processor, a method for providing a dual mode view of an environment for software development and deployment, comprising: intercepting a request of a user for performing an operation on an entity of the environment while in sandbox view; and retrieving from storage and appending to the request a sandbox token obtained from the server responsive to the user switching from production view to sandbox view, wherein the sandbox token being configured for enabling the server performing processing of the request comprising: validating sandbox view selection by the user; determining identification of the entity of the request using a data structure comprising identification of each entity in a datastore of the environment as one of a production entity and a sandbox entity, the data structure further comprising an indication of each production entity modified in sandbox view; and based on determination of the identification of the entity of the request and result of performing the operation thereon, updating at least one of the data structure and datastore; wherein each sandbox entity being filtered out of production view and each production entity modified in sandbox view being filtered out of sandbox view.

According to yet another aspect of the disclosed subject matter there is provided a computer program product comprising: a non-transitory computer readable storage medium; program instructions for executing, by a processor, a method for providing a dual mode view of an environment for cloud computing software development and deployment accessible via a server, comprising: receiving a request of a user for performing an operation on an entity of the environment; and performing processing of the request comprising: responsive to the request comprising a sandbox token, validating sandbox view selection by the user; determining identification of the entity of the request using a data structure comprising identification of each entity in a datastore of the environment as one of a production entity and a sandbox entity, the data structure further comprising an indication of each production entity modified in sandbox view; and based on determination of the identification of the entity of the request and result of performing the operation thereon, updating at least one of the data structure and datastore; wherein each sandbox entity being filtered out of production view and each production entity modified in sandbox view being filtered out of sandbox view.

Unless otherwise defined, all technical and/or scientific terms used herein have the same meaning as commonly understood by one of ordinary skill in the art to which embodiments. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

Some embodiments relate to data engineering and, more specifically, but not exclusively, to a virtual sandbox environment of cloud computing resources.

One pre-existing approach to providing a sandbox environment is by copying the live environment, also referred to herein as production environment, into a completely separate environment. Testing and experimenting then may take place on the copied environment, with no impact on the live one. However, such approach suffers from significant drawbacks and disadvantages: first, in most cases, the data may be only partially copied from the live environment to the sandbox one. This data deficiency in the sandbox makes it impossible to truly appreciate the full implications of users' sandbox actions; second, copying the data from one environment to another, along with the entire configuration, may be a very time-consuming process; third, while working on a sandbox environment, the live environment may get constantly updated with new data and configuration changes. This means that within time, the sandbox environment will no longer truly represent the production environment.

In some embodiments, rather than have two separate environments, there may be provided two separate modes, a sandbox mode and a production mode, within a same environment, where changes made in the sandbox mode may have zero impact on the production mode. Having the two modes in the same environment may eliminate a process of copying data from one environment to another, meaning the data may expectedly be full and complete and up to date, and the setup process may be instantaneous. Furthermore, each of the two modes may remain consistently identical with the passage of time and both may be perfectly aligned, at any given point in time.

In some embodiments, provision of the two separate modes may be achieved by making a distinction between sandbox and production association right down to an entity level, rather than at an environment level. Accordingly, for any given list of entities, such as for example dashboards, reports, pages, data streams, etc., each entity in the list may be identified as either being a production entity or sandbox entity.

Given an identification of each of the entities in the environment or workspace as either production or sandbox entity, care may be taken to making sure that the right entities may be accessible from the relevant environment view, i.e. that sandbox entities may be accessed only in sandbox mode and/or that production entities edited and/or deleted in sandbox mode may not be accessed until reverting to production mode. Since within production mode, all of the sandbox entities may be filtered out and only the production entities may be accessible, as consequence thereof this may mean in practice that anything a user may do within sandbox mode may have no impact on production whatsoever. Within the sandbox view of the virtual sandbox environment, a user may have both production and sandbox entities. This may be so because in addition to having an option of adding new sandbox entities, a user may also want to be able to edit and/or delete existing production entities and see how all those entities resulting from such operation(s) interact.

In some embodiments, responsive to a user selecting to switch from production to sandbox view, invoking of an application programming interface (API) on a server via which access to the virtual sandbox environment being provided may take place, optionally in a "behind the scenes" manner not discernable to the user. The server may register this switching to sandbox mode action and respond with a unique sandbox token. The sandbox token may be saved on the user's browser session. Responsive to receipt of the sandbox token at the user's browser or likewise client application program, all requests sent from the client may be intercepted and the sandbox token may be added to each request. Responsive to decoding of the sandbox token from a received request at the server, by which sandbox mode usage may be indicated, the token may be propagated through method call stack(s) and allow the server to decide which way to create and/or update entries configuration and/or which data to retrieve from storage.

A user working in a virtual sandbox environment may wish to perform at least one operation on at least one entity, which may be categorized into one of three types as follows: (i) an addition of an entity not existing in production environment; (ii) an editing of an existing production entity; and (iii) a deletion of an existing production entity. To allow management of entities in the virtual sandbox environment, a data structure such as a database table or the like, may be used for registering each such sandbox operation performed, optionally together with a common infrastructure such as a datastore for storing all entities of the environment and data thereof, e.g. data warehouse or likewise repository.

For example, responsive to a production entity of a data stream type with an identifier '123' being edited in sandbox mode, the data structure may be updated by insertion of an entry describing that production entity '123' being replaced with sandbox entity '456', such as in bottom row of the following Table 1:

TABLE 1

| Workspace ID | Entity Type | Original Entity ID | Sandbox Entity ID | Operation |
| --- | --- | --- | --- | --- |
| 1 | Data Stream | 123 | 456 | REPLACE |

Data of both data streams, i.e. production entity '123' and edited version thereof in sandbox '456', may be stored in a common datastore of the environment, for at least a duration of a user sandbox session and/or longer period.

As another example, responsive to a new entity not existing in production environment being added in sandbox mode, the data structure may be updated by insertion of an entry describing that sandbox entity '456' being added, such as in the following Table 2:

TABLE 2

| Workspace ID | Entity Type | Original Entity ID | Sandbox Entity ID | Operation |
| --- | --- | --- | --- | --- |
| 1 | Data Stream | | 456 | ADD |

As yet another example, responsive to a production entity with identifier '123' being deleted in sandbox mode, the data structure may be updated by insertion of an entry describing that production entity 123 being removed from the virtual sandbox, such as in the following Table 3:

TABLE 3

| Workspace ID | Entity Type | Original Entity ID | Sandbox Entity ID | Operation |
| --- | --- | --- | --- | --- |
| 1 | Data Stream | 123 | | REMOVE |

The data structure storing identification of each entity in the virtual sandbox environment as either production or sandbox entity and registering operation type performed thereon may be referred to herein also as "sandbox cache" or merely "cache", whereas an action of writing data thereto, e.g. insertion and/or editing of an entry such as in one of exemplary entries illustrated in Tables 1 to 3 herein, may be referred to herein as "cache invalidation".

In some embodiments, data querying in either production or sandbox mode may be supported in a similar manner by using filtration of corresponding entities in accordance with cache entries of registered operation(s) as described herein. To allow differentiation between different entities, such as for example a plurality of data streams, an identifier of each respective entity may be part of each and every row of data. Responsive to a user changing view from production to sandbox mode, all subsequent operations performed by the user may be referred to as sandbox operations. As an illustrative example, in response to editing of a data stream by a user in sandbox mode, what may actually happen "behind the scenes", i.e. in a manner hidden from the user, may be that a new data stream may be created with a different identifier, and the relevant data i.e. data of the original data stream being edited, may be re-loaded to a data store of the virtual sandbox environment with the new identifier. As result, by having both sets of data, i.e. production and sandbox, reside in the data store, and with knowledge of a "replace data" relation between the two entities, indicated by respective entry in the sandbox cache, manipulation of returned results to a database query submitted and filtering in and out the desired data according to the user sandbox/production mode respectively, may be enabled.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1B:
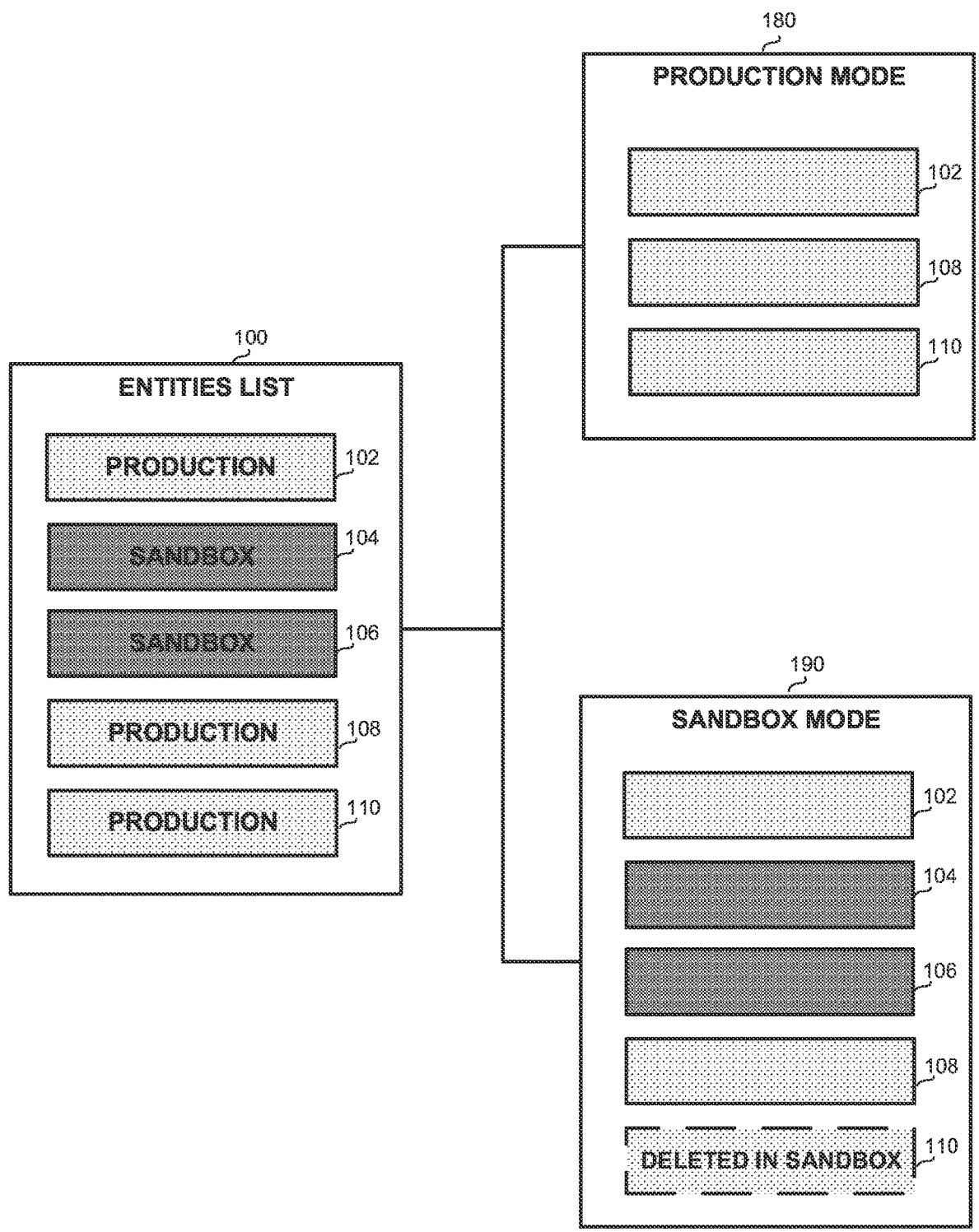
FIG. 1B is a schematic block diagram of exemplary dual views in production and sandbox mode of a virtual sandbox environment of cloud computing resources.

Reference is now made to FIG. 1A, which is a schematic block diagram of an exemplary entities list in a virtual sandbox environment of cloud computing resources. Reference is also made to FIG. 1B, which is a schematic block diagram of exemplary dual views in production and sandbox mode of a virtual sandbox environment of cloud computing resources.

An entities list such as 100 may comprise a listing of entities of the virtual sandbox environment. For each entity in entities list 100 an identification of the entity as a production entity or a sandbox entity may be defined. Entities list 100 may comprise zero or more production entities, such as 102, 108 and 110, and/or zero or more sandbox entities, such as 104 and 106.

In some embodiments, dual mode views of the virtual sandbox environment may be provided, such as view of production mode 180 and/or view of sandbox mode 190 as shown in FIG. 1B. In production mode 180 only production entities such as 102, 108 and 110 may be visible whereas all sandbox entities such as 104 and 106 may be filtered out. In sandbox mode 190 sandbox entities 104 and 106 may be visible in addition to original production entities 102 and 108 left unchanged by user while in sandbox mode. Production entities deleted by user while in sandbox mode such as production entity 110 may be filtered out in sandbox mode 190.

Optionally filtered out production entities in sandbox mode such as 190 may be rendered invisible or, alternatively, be visually distinguished from other entities, e.g. presented in grey coloring, displayed as semi-transparent, and/or the like.

Optionally deletion of a production entity in sandbox mode may result either from removal of the entity or replacement thereof by a sandbox entity responsive to editing by user as described herein.

Figure 2:
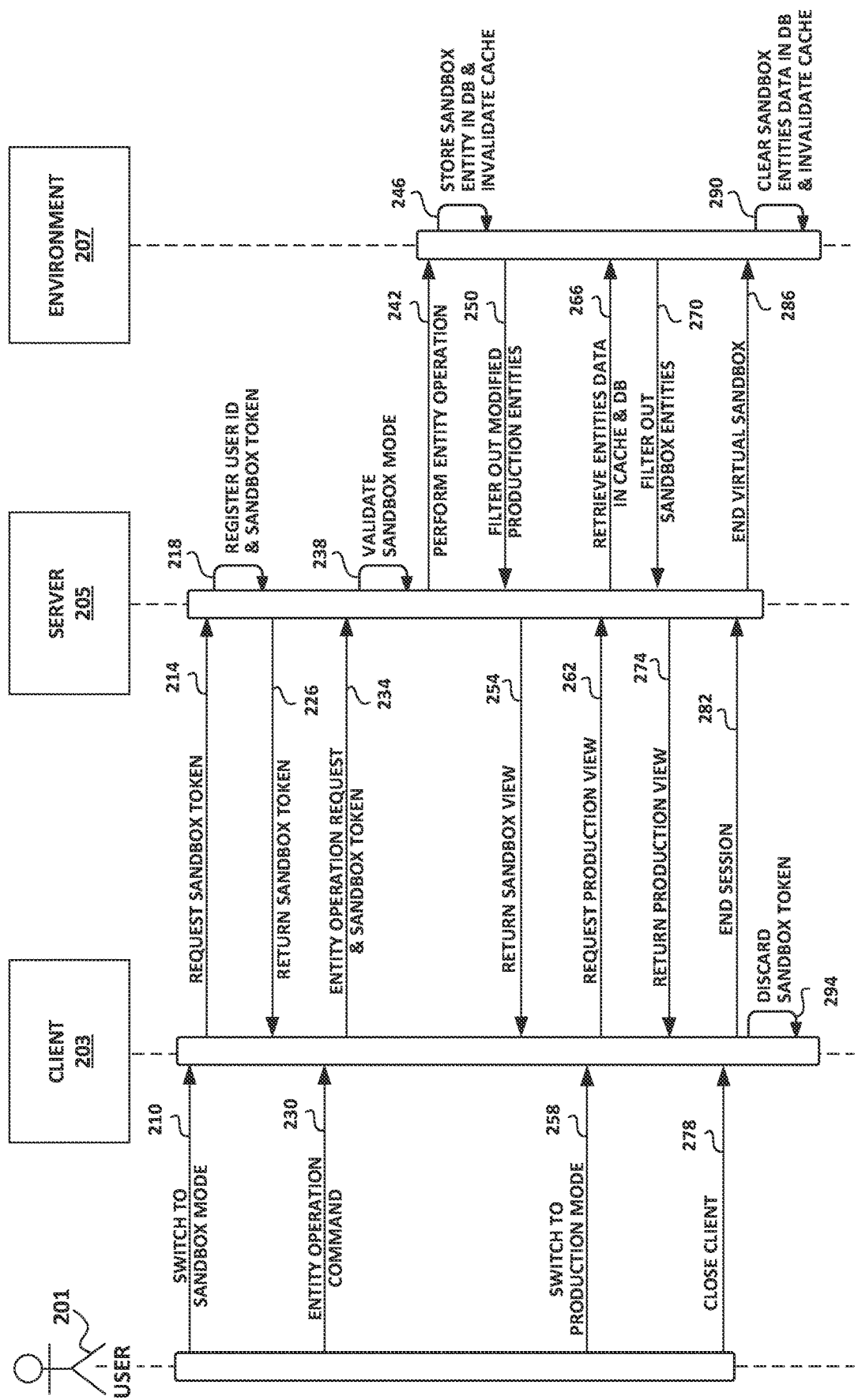
FIG. 2 is a sequence diagram of an optional flow of operations for providing a virtual sandbox environment of cloud computing resources.

Reference is now made to FIG. 2, which is a sequence diagram of an optional flow of operations for providing a virtual sandbox environment of cloud computing resources.

As shown in FIG. 2, a user 201 may be provided with a web application program such as client 203 for interacting, via a server 205 providing access thereto, with an environment 207 of cloud computing resources, e.g. software development and deployment cloud environment.

At 210, user 201 may switch to sandbox mode in client 203. At 214, client 203 may send to server 205 request for sandbox token. At 218, server 205 may respond to the request by issuing a sandbox token and registering thereof in a sandbox cache along with an identifier of user 201, optionally comprising additional attributes such as a workspace identifier, a user session identifier, and/or the like. At 226, server 205 may return the sandbox token to client 203.

At 230, user 201 may input entity operation command in client 203, for performing an operation on an entity of the environment while in sandbox mode. At 234, client 203 may intercept the entity operation command and append the sandbox token to an entity operation request being sent to server 205. At 238, server 205 may validate sandbox mode of user 201 using the sandbox token from the request received. At 242 server 205 may perform entity operation in accordance with the request from client 203, using flow of operations such as described herein with reference to FIGS. 3 to 6 for example. At 246, sandbox entity created by result of performing entity operation, e.g. addition of a new entity not existing in production mode or copied production entity edited in sandbox mode, may be stored in sandbox entity database (DB), and the sandbox cache may be accordingly invalidated as per the entity operation performed. At 250, any and all sandbox modified production entities, i.e. production entities edited and/or deleted in sandbox mode, and data thereof may be filtered out for providing sandbox view of environment 207, and at 254, server 205 may return sandbox view resulting thereof to client 203 for presentation to user 201.

At 258, user 201 may switch to production mode in client 203. At 262, client 203 may send to server 205 request for production view accordingly. At 266, server 205 may respond and retrieve entities data from the sandbox entity database and sandbox cache. At 270, all and any sandbox entities as recorded in the database and cache may be filtered out from view of environment 207, and at 274 server 205 may return production view resulting thereof to client 203 for presentation to user 201.

At 278, user 201 may choose to end working session and close client 203, which may result at 282 in end session notice to server 205. At 286, server 205 may respond and accordingly end current virtual sandbox session in environment 207, such that at 290, all sandbox entities and data thereof may be cleared from the database and the cache may be invalidated. At 294, client 203 may discard the sandbox token used during the session ended.

Figure 3:
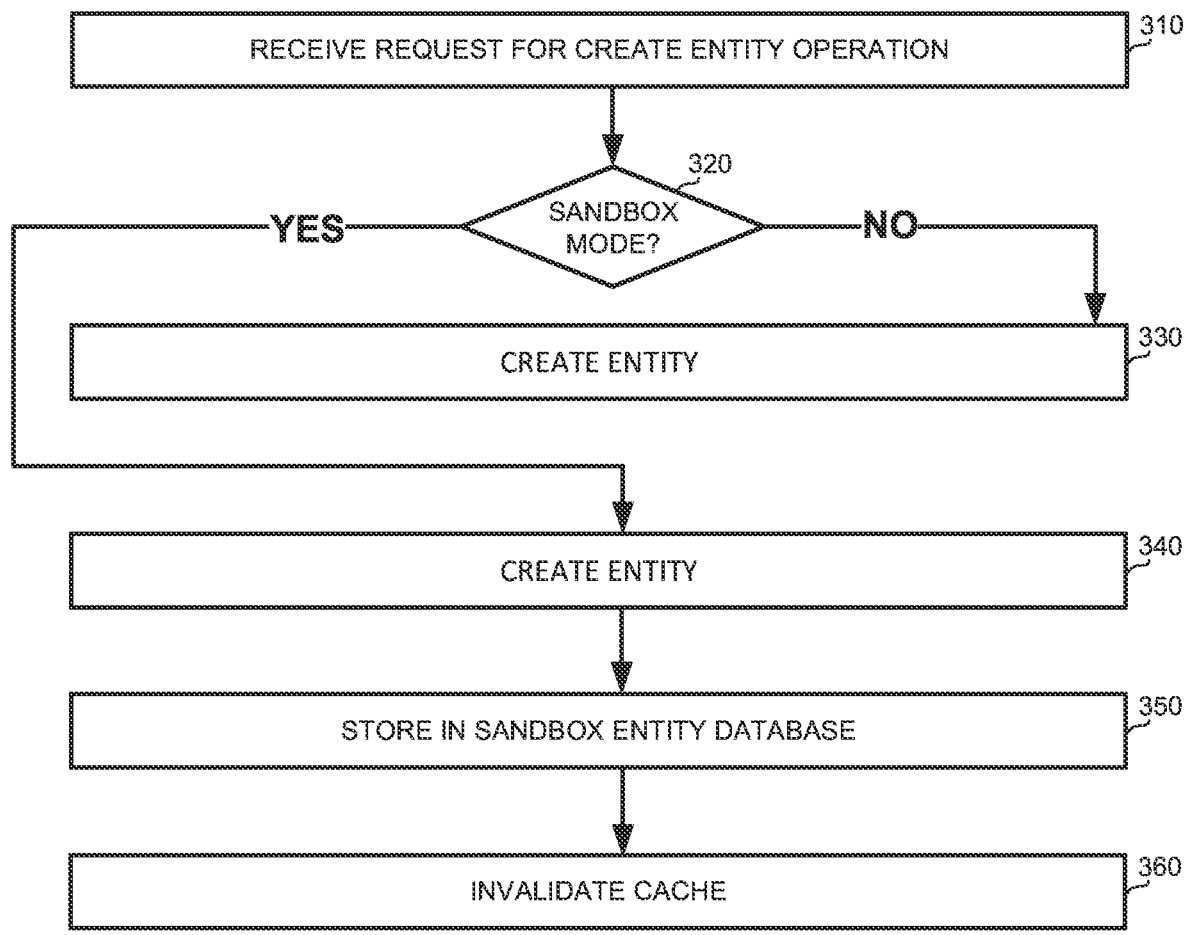
FIG. 3 is a flowchart diagram of a method for performing create entity operation.

Reference is now made to FIG. 3, which is a flowchart diagram of a method for performing create entity operation.

At 310, request by a user for performing create entity operation may be received.

At 320 determination may be made as to whether the user being in sandbox mode or not. At 330, in case of production mode being determined at 320 to apply for the request received at 310, the entity may be created as a production entity, e.g. by running regular create entity protocol for an entity of a type as in the request. Otherwise at 340, in case of sandbox mode being determined at 320, the entity may be created as a sandbox entity, e.g. using same create entity protocol and proceeding to 350, at which the entity created at 340 may be stored in sandbox entity database, and at 360 the sandbox cache may be invalidated, e.g. by registering an identifier of the entity created and addition operation thereof, such as in exemplary cache entry of Table 2 herein.

Figure 4:
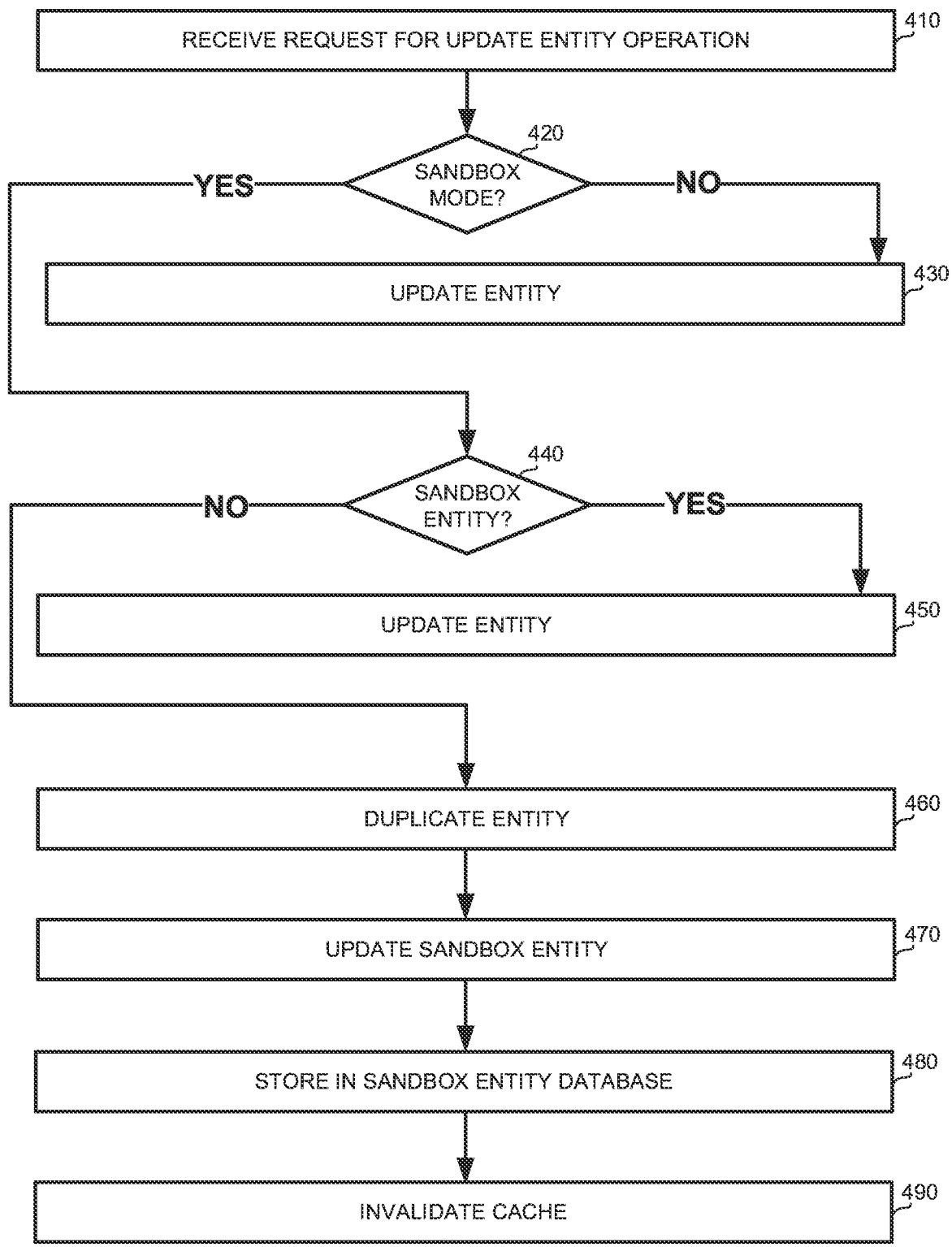
FIG. 4 is a flowchart diagram of a method for performing update entity operation.

Reference is now made to FIG. 4, which is a flowchart diagram of a method for performing update entity operation.

At 410, request by a user for performing update entity operation may be received. At 420 determination may be made as to whether the user being in sandbox mode or not. At 430, in case of production mode being determined at 420 as being applicable to the request received at 410, the entity may be updated. Otherwise at 440, in case of sandbox mode being determined at 420, determination may be made as to whether the entity for which updating being requested being a sandbox entity or not. At 450, in case the entity being determined at 440 to be a sandbox entity, updating thereof may be performed similarly as in 430. Otherwise at 460, the entity requested to be updated may be duplicated, e.g. using identifier thereof from which new entity may be created. At 470 the sandbox entity copy obtained at 460 from the original production entity may be updated as requested at 410. At 480 the sandbox cache may be invalidated, e.g. by registering an identifier of the entity created and an operation of replacement thereby of the entity requested to be updated, such as in exemplary cache entry of Table 1 herein.

Figure 5:
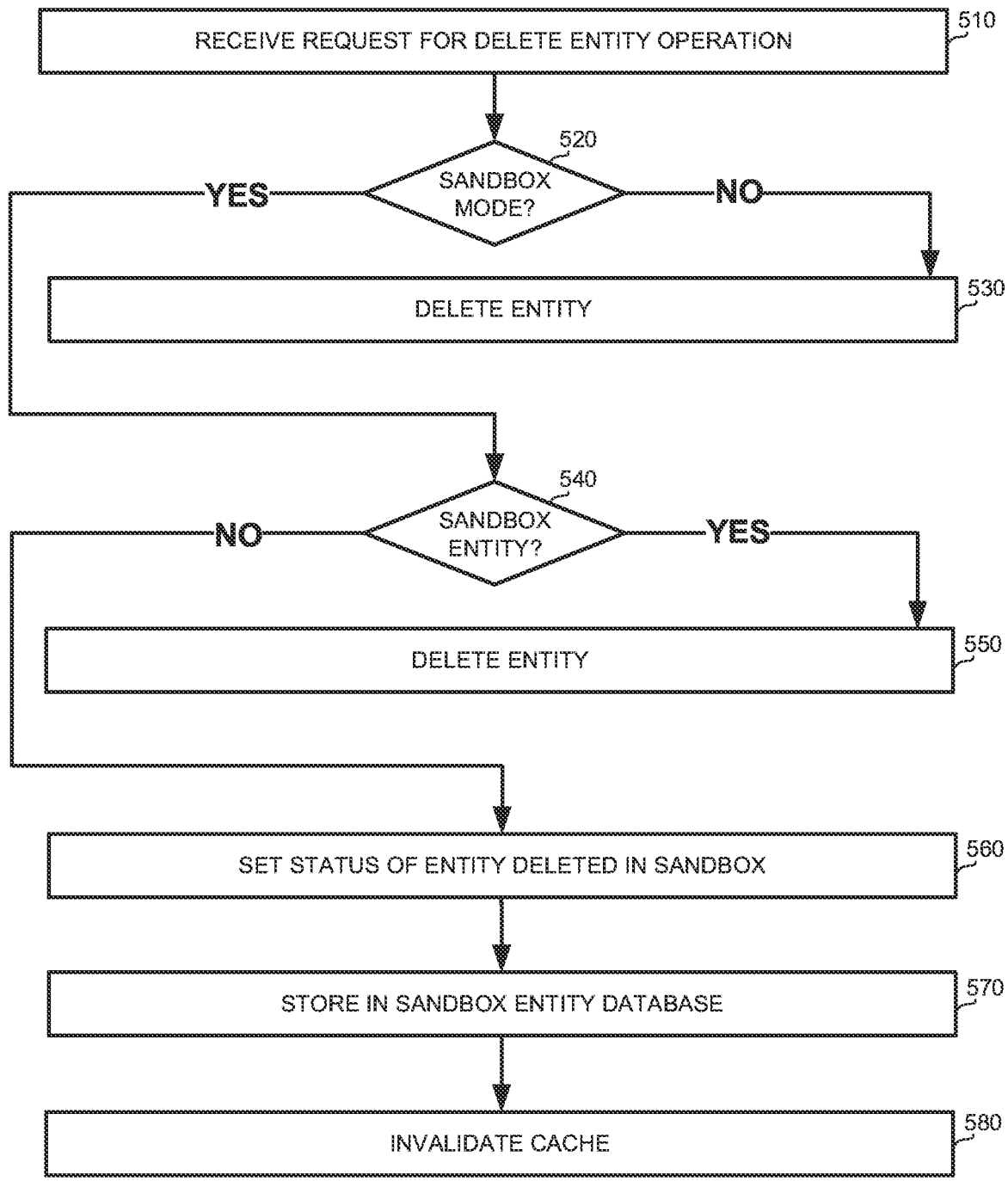
FIG. 5 is a flowchart diagram of a method for performing delete entity operation.

Reference is now made to FIG. 5, which is a flowchart diagram of a method for performing delete entity operation.

At 510, request by a user for performing delete entity operation may be received.

At 520 determination may be made as to whether the user being in sandbox mode or not. At 530, in case of production mode being determined at 520 as applying to the request received at 510, the entity may be deleted. Otherwise at 540, in case of sandbox mode being determined at 520, determination may be made as to whether the entity requested to be deleted being a sandbox entity or not. At 550, in case the entity being determined at 540 to be sandbox entity, deletion thereof may be performed similarly as in 530. Otherwise at 560, the entity requested to be deleted may be set with status of entity deleted in sandbox mode, and at 570 the sandbox cache may be invalidated, e.g. by registering identifier of the entity requested to be deleted and an operation of removal thereof in sandbox, such as in exemplary cache entry of Table 3 herein.

Figure 6:
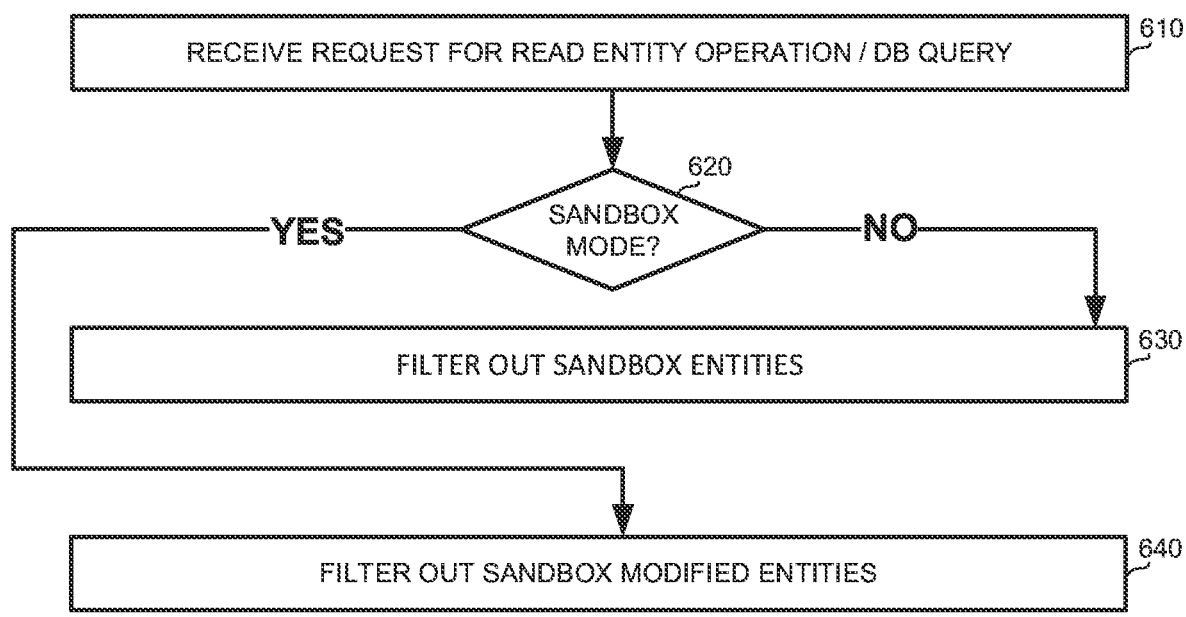
FIG. 6 is a flowchart diagram of a method for performing read entity operation.

Reference is now made to FIG. 6, which is a flowchart diagram of a method for performing read entity operation.

At 610, request by a user for performing read entity operation, or a database query, may be received. At 620 determination may be made as to whether the user being in sandbox mode or not. At 630, in case of production mode being determined at 620 as applying to the request received at 610, sandbox entities may be filtered out from view of the virtual sandbox environment, or from results returned from database to the query, and data of production entities only may be presented to the user. Otherwise at 640, in case sandbox mode being determined at 620 as applying to the request received at 610, sandbox modified entities, i.e. production entities deleted and/or edited in sandbox mode, may be filtered out from view of the virtual sandbox environment, or from results returned from database to the query, and data of sandbox entities and/or unmodified production entities only may be presented to the user.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant cloud computing environments and resources will be developed and the scope of the term cloud computing is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to embodiments. To the extent that section headings are used, they should not be construed as necessarily limiting. In addition, any priority document(s) of this application is/are hereby incorporated herein by reference in its/their entirety.

What is claimed is:

1. A method for providing a dual mode view of an environment for cloud computing software development and deployment accessible via a server, comprising:

intercepting a request of a user for performing an operation on an entity of the environment while in sandbox view; and retrieving from storage and appending to the request a sandbox token obtained from the server responsive to the user switching from production view to sandbox view, wherein the sandbox token being configured for enabling the server performing processing of the request comprising:

validating sandbox view selection by the user;

determining identification of the entity of the request using a data structure comprising identification of each entity in a datastore of the environment as one of a production entity and a sandbox entity, the data structure further comprising an indication of each production entity modified in sandbox view; and based on determination of the identification of the entity of the request and result of performing the operation thereon, updating at least one of the data structure and datastore;

wherein each sandbox entity being filtered out of production view and each production entity modified in sandbox view being filtered out of sandbox view.

2. The method of claim 1, wherein the operation on the entity being selected from the group consisting of: creating the entity; reading data from the entity; updating data of the entity; and deleting the entity.

3. The method of claim 1, wherein the sandbox token being stored for a duration of a browser session of the user.

4. The method of claim 1, wherein the sandbox token being unique.

5. The method of claim 1, wherein at least one entity of the environment is of a type selected from the group consisting of: a data stream; a page; a report; and a dashboard.

6. A computer program product comprising:

a non-transitory computer readable storage medium storing program instructions for executing, by a processor, the method of claim 1.

7. A method for providing a dual mode view of an environment for software development and deployment, comprising:

receiving a request of a user for performing an operation on an entity of the environment; and performing processing of the request comprising:

responsive to the request comprising a sandbox token, validating sandbox view selection by the user;

determining identification of the entity of the request using a data structure comprising identification of each entity in a datastore of the environment as one of a production entity and a sandbox entity, the data structure further comprising an indication of each production entity modified in sandbox view; and based on determination of the identification of the entity of the request and result of performing the operation thereon, updating at least one of the data structure and datastore;

wherein each sandbox entity being filtered out of production view and each production entity modified in sandbox view being filtered out of sandbox view.

8. The method of claim 7, wherein processing of the request comprising adding the entity to the datastore, defining identification of the entity as a sandbox entity and indicating an operation of addition of the entity in the data structure responsive to validating sandbox view selection and the operation of the request being addition of the entity.

9. The method of claim 7, wherein processing of the request comprising performing the operation on a copy of the entity and adding thereof to the datastore, defining identification of the copy as a sandbox entity and indicating an operation of replacement of the entity in the data structure responsive to validating sandbox view selection, the identification of the entity being determined as production entity and the operation of the request being editing of the entity.

10. The method of claim 7, wherein processing of the request comprising indicating an operation of deletion of the entity in the data structure responsive to validating sandbox view selection, the identification of the entity being determined as production entity and the operation of the request being deleting of the entity.

11. The method of claim 7, wherein the sandbox token being generated and sent to a client responsive to a request received therefrom indicating the user switching from production view to sandbox view.

12. The method of claim 7, wherein the sandbox token being unique.

13. The method of claim 7, wherein at least one entity of the environment is of a type selected from the group consisting of: a data stream; a page; a report; and a dashboard.

14. A computer program product comprising:

a non-transitory computer readable storage medium storing program instructions for executing, by a processor, the method of claim 7.

15. A system for providing a dual mode view of an environment for software development and deployment, comprising:

a processing circuitry adapted to execute a code for:

receiving a request of a user for performing an operation on an entity of the environment; and performing processing of the request comprising:

responsive to the request comprising a sandbox token, validating sandbox view selection by the user;

determining identification of the entity of the request using a data structure comprising identification of each entity in a datastore of the environment as one of a production entity and a sandbox entity, the data structure further comprising an indication of each production entity modified in sandbox view; and based on determination of the identification of the entity of the request and result of performing the operation thereon, updating at least one of the data structure and datastore;

wherein each sandbox entity being filtered out of production view and each production entity modified in sandbox view being filtered out of sandbox view.

* * * * *